Figure 1:
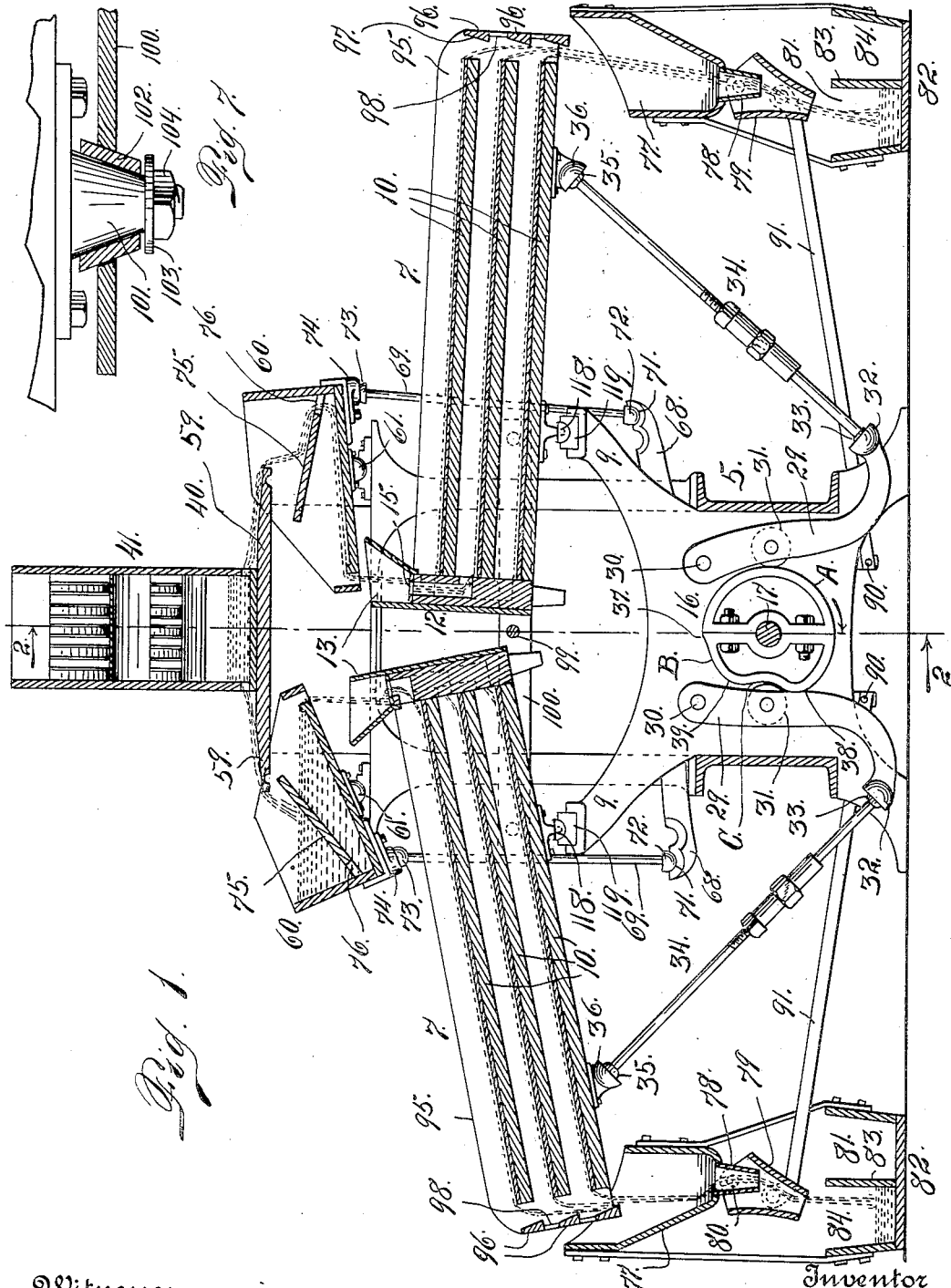

A. R. WILFLEY.
CONCENTRATOR.
APPLICATION FILED OCT. 23, 1911.

1,056,388.

Patented Mar. 18, 1913.
6 SHEETS—SHEET 2.

Witnesses
Otto E. Hoddick.
C. H. Rosener.

Inventor
Arthur R. Wilfley.
By A. J. O'Brien
Attorney

A. R. WILFLEY.
CONCENTRATOR.
APPLICATION FILED OCT. 23, 1911.
1,056,388.
Patented Mar. 18, 1913.
6 SHEETS—SHEET 3.
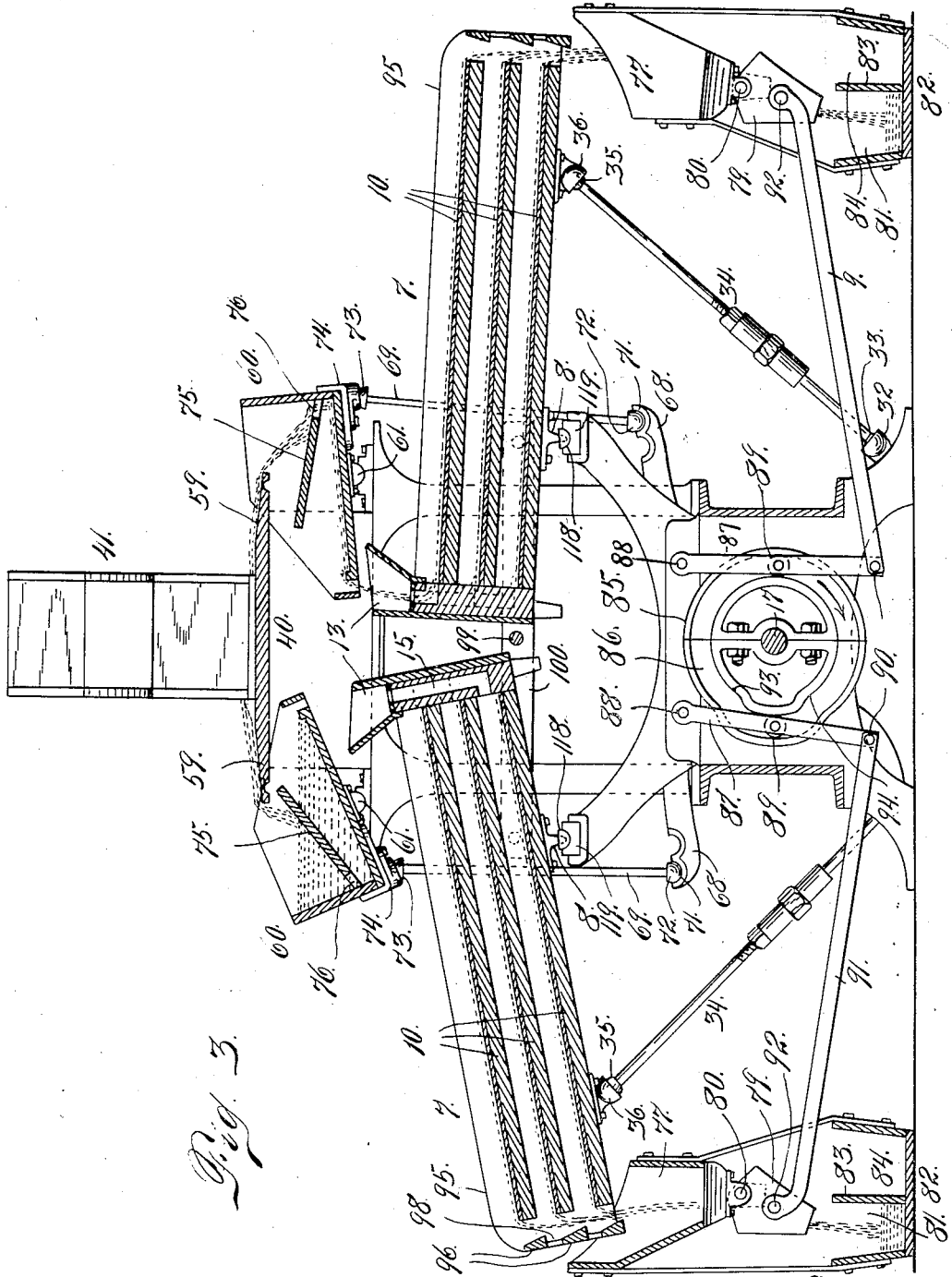

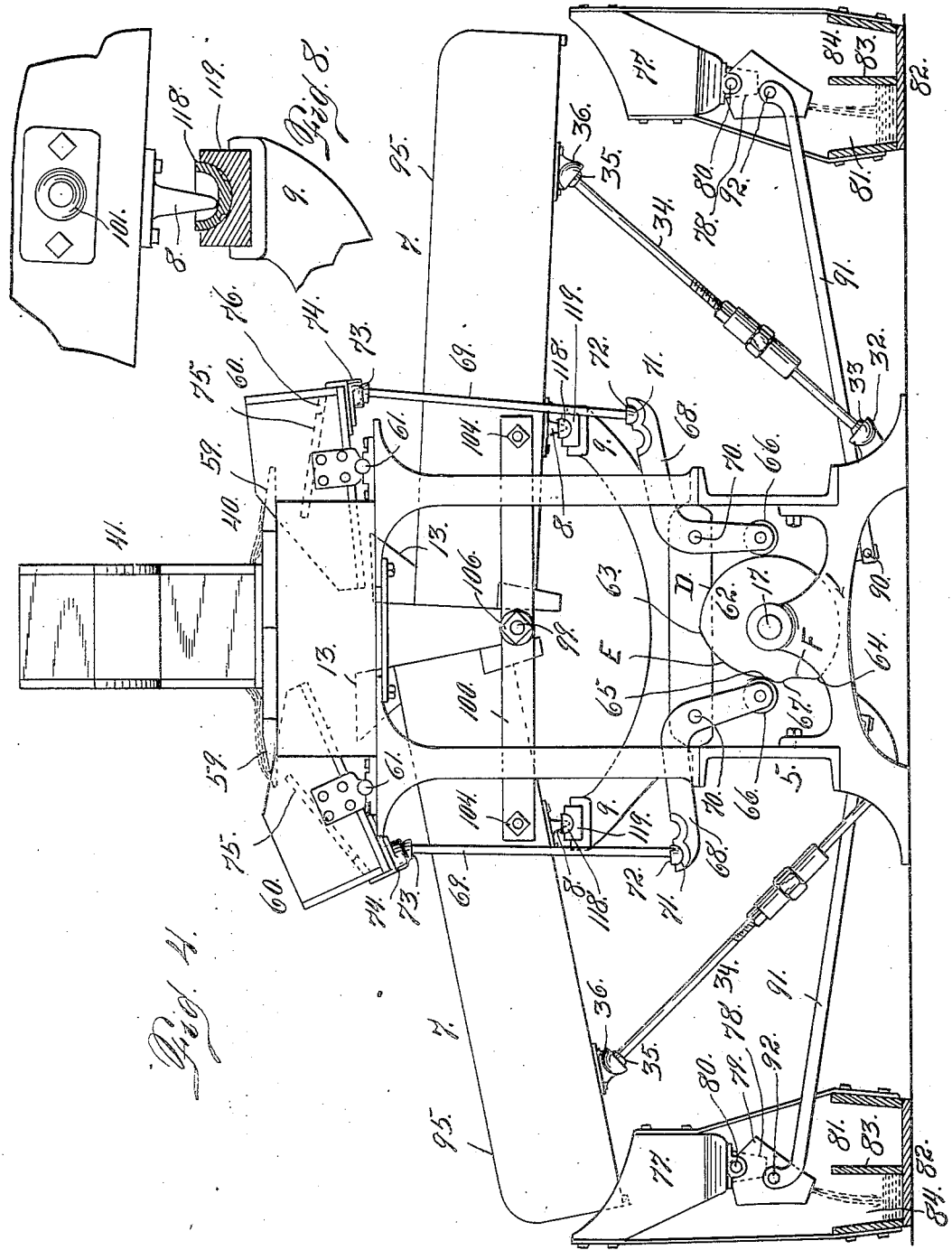

A. R. WILFLEY.
CONCENTRATOR.
APPLICATION FILED OCT. 23, 1911.
1,056,388.
Patented Mar. 18, 1913.
6 SHEETS—SHEET 5.
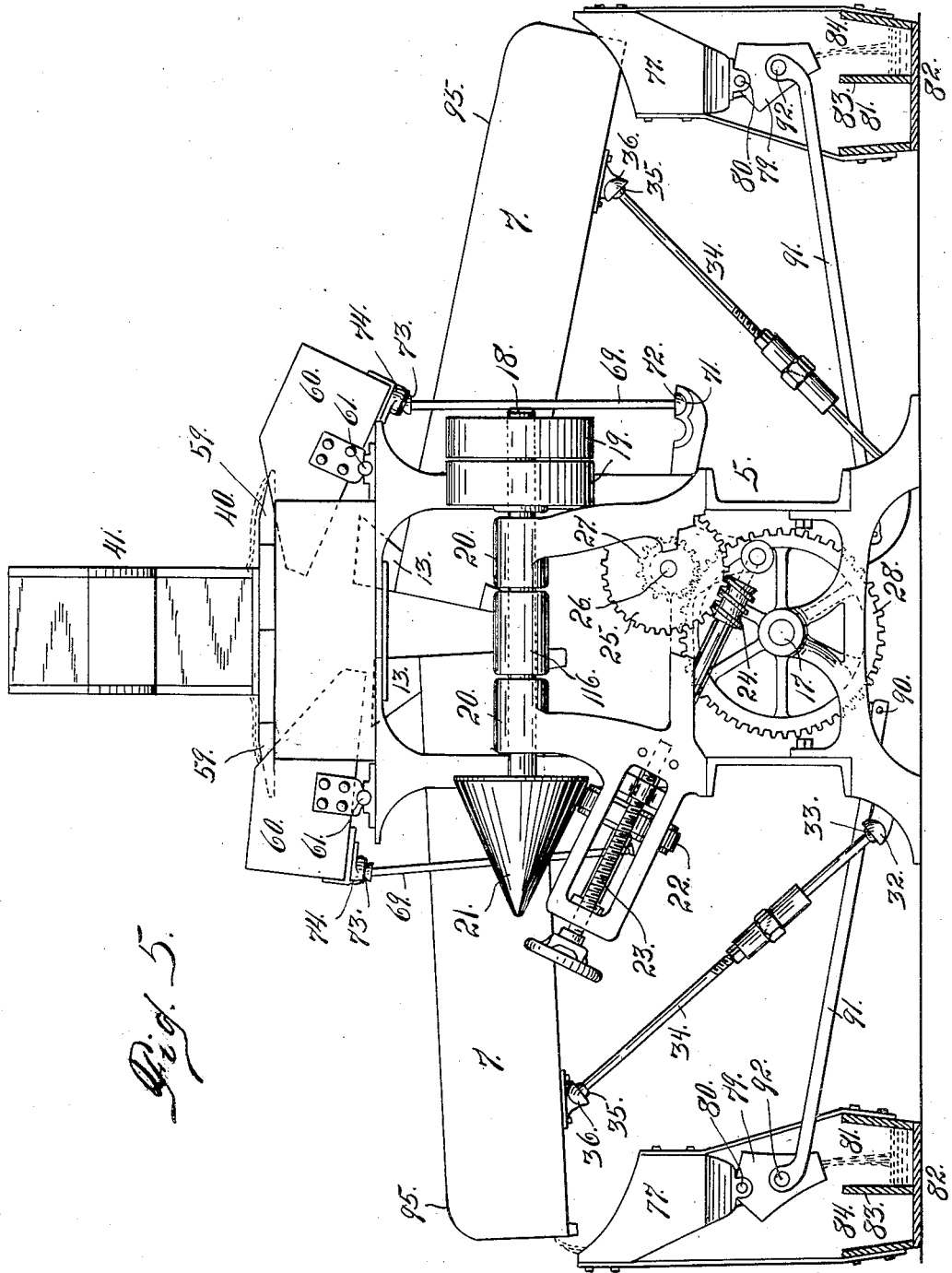
Witnesses
Otto E. Hoddick
C. H. Rossmer
Inventor
Arthur R. Wilfley
By 
Attorney

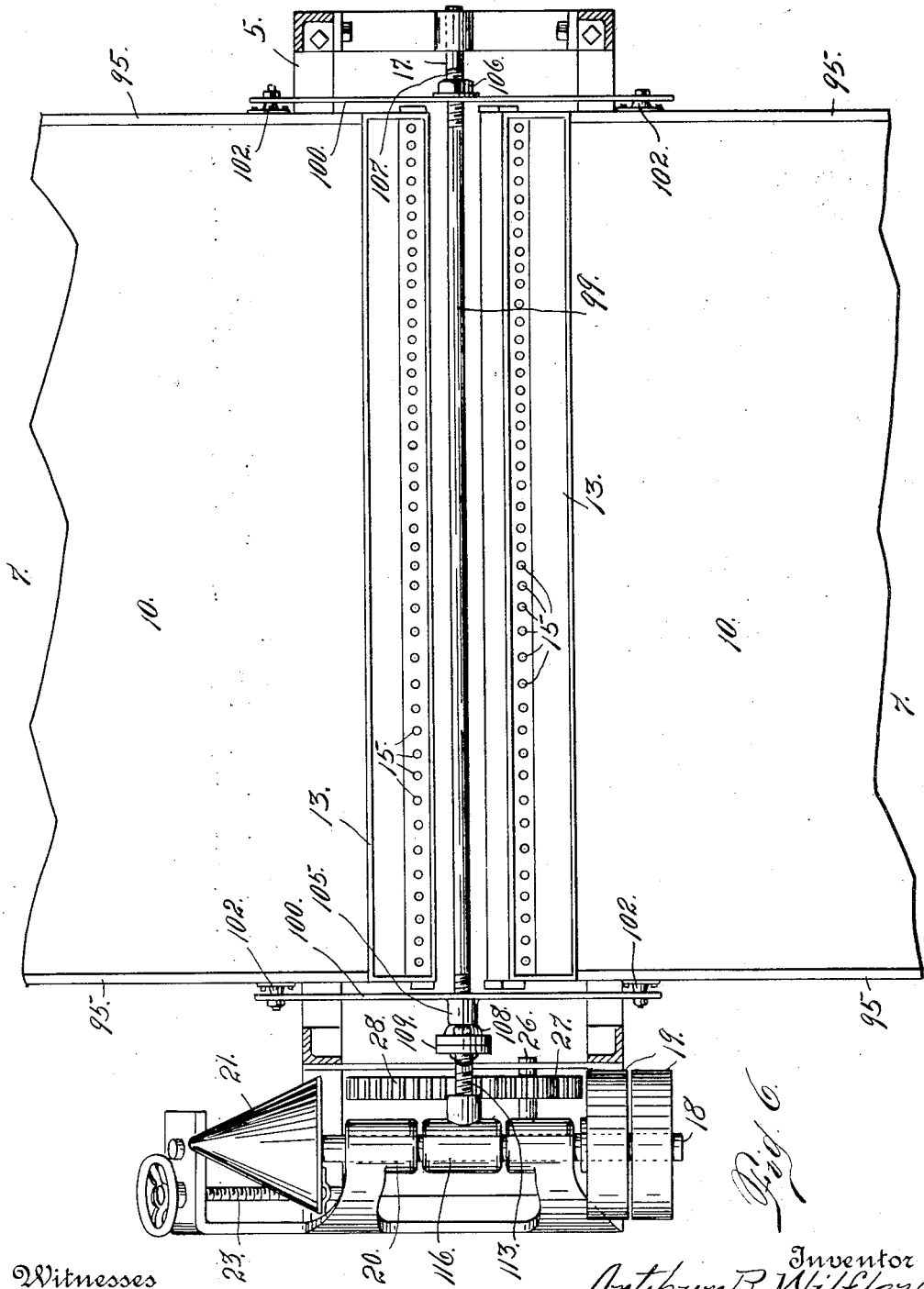

UNITED STATES PATENT OFFICE.

ARTHUR R. WILFLEY, OF DENVER, COLORADO.

CONCENTRATOR.

1,056,388. Specification of Letters Patent. Patented Mar. 18, 1913.

Application filed October 23, 1911. Serial No. 656,318.

*To all whom it may concern:*

Be it known that I, ARTHUR R. WILFLEY, a citizen of the United States, residing in the city and county of Denver and State of Colorado, have invented certain new and useful Improvements in Concentrators; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in concentrators, of the class set forth in my previous application, Serial No. 606,196, filed February 2nd, 1911. The tiltable tables disposed in this application, their arrangement with reference to each other and the manner of automatically manipulating them for the purpose of changing the table's inclination, are fully set forth and claimed in said previous application.

My present improvement relates, more especially, to the manipulation of a feed launder, which is adapted to furnish wash water to concentrating tables, as well as pulp,—that is to say, the water mixed with the pulp serves to supply the necessary water for dressing the ore during the period of stratifying the same upon the table, as well as water which facilitates the discharge of the concentrates when the table is tilted to the concentrate-discharge position.

In a machine of this class, each table is adapted to assume three different positions, the first position being either horizontal or slightly inclined, depending upon the nature of the ore; the second position being one of slightly greater inclination, while the third position is one of considerable inclination. The table occupies the first position during the greater period, and the ore to be treated is delivered thereto in the form of pulp during the whole of such period. This pulp is delivered to the table by the feed launder. The table then, by virtue of its connection with suitable operating mechanism, is slightly tilted during which time the feed launder is tilted rearwardly, whereby the solid material has a tendency to settle, since the bottom of the launder is inclined downwardly from its discharge extremity toward the rear or closed extremity, thus allowing water to escape to the table during what may be termed the dressing period of the ore, this period being comparatively short. The table then tilts to the position of greatest inclination for the purpose of discharging the accumulated concentrates, and, as soon as this occurs, the feed launder is tilted forwardly to increase the discharge of water for the purpose of facilitating the discharge of the concentrates. This concentrate-discharge position exists for a comparatively short period, after which the table is returned to its normal position, and the feed launder is also tilted forwardly to what may be termed its normal position, and, as the pulp has been accumulating in the feed launder during the ore dressing and concentrates-discharge position of the table, the accumulated pulp will be discharged in a mass upon the table, thus quickly covering the table with a charge of concentrates, without waiting for this to occur by the slow operation of the normal passage of the pulp from the distributer to the feed launder.

Having briefly outlined my improved construction, I will proceed to describe the same in detail, reference being made to the accompanying drawing, in which is illustrated an embodiment thereof.

Figure 2:
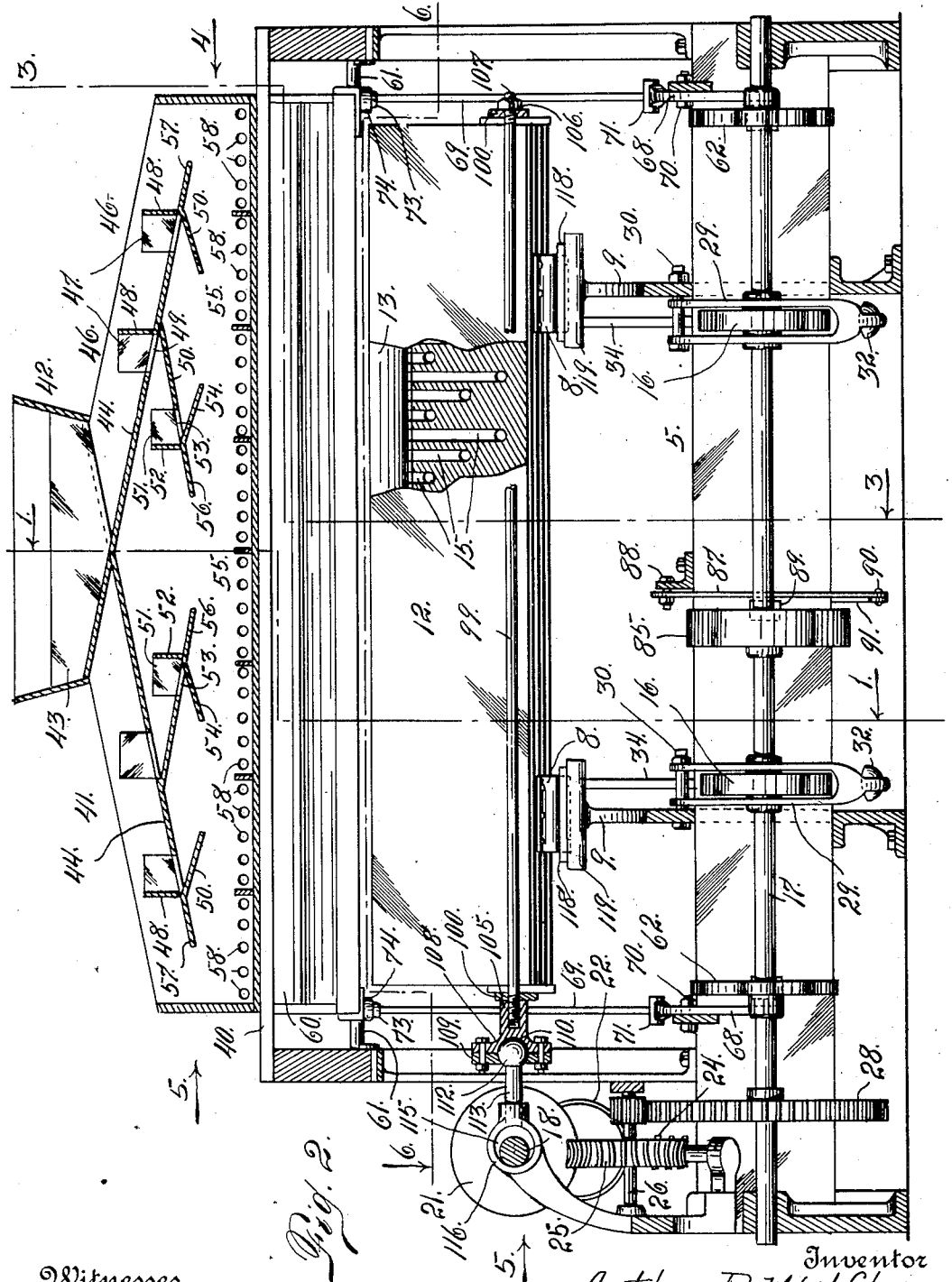

In this drawing: Figure 1 is a vertical section of the machine, taken on the line 1—1 of Fig. 2, looking toward the left. Fig. 2 is a central section, taken on the line 2—2 of Fig. 1, looking toward the right, the cam mechanism being shown in elevation. Fig. 3 is a section, taken on the line 3—3 of Fig. 2, looking toward the left. Fig. 4 is an end elevation, looking in the direction of arrow 4, Fig. 2. Fig. 5 is an elevation of the opposite end of the machine, or a view looking in the direction of arrow 5, Fig. 2. Fig. 6 is a top plan view of the structure, showing the two tables partly broken away and illustrating the manner of connecting and operating the tables. Fig. 7 is a fragmentary top view, partly in section and on a larger scale, illustrating the manner of pivoting each table to allow it to assume its various positions. Fig. 8 is a fragmentary side elevation of one of the tables, illustrating the manner of supporting the same, the supporting structure being illustrated in vertical section.

The same reference characters indicate the same parts in all the views.

Let the numeral 5 designate a suitable framework, forming a support for two tables 7, which are tiltably mounted by means of bearings 8, which engage stationary supports 9 forming a part of the framework of the structure. As shown in the drawing, each table is composed of three decks arranged one above another and rigidly connected to move in harmony, the head of each table being provided with a subdivider 12 consisting of a trough 13 having openings 15 in its bottom, communicating with the various decks 10 of the table, whereby the material delivered to the trough 13 is delivered equally to the different decks of the table, the subdivider being of the same length as the width of the decks in order to maintain the distribution of the pulp, which has been effected prior to its delivery to the subdividers.

Each table, while the machine is in operation, assumes three different positions. One of these positions, what I will term the first position, may be either horizontal or slightly inclined. This position is maintained by the table during the greater portion of the time. The table is then subsequently given a slight inclination from the first position, and it is finally given the maximum inclination, which may be termed the third position.

The tilting of the tables is accomplished through the instrumentality of a pair of cams 16, mounted on a shaft 17, to which is imparted a very slow rotary movement through the instrumentality of the following mechanism: Let the numeral 18 designate the power shaft containing fast and loose pulleys 19, the said shaft being journaled in suitable boxes 20 mounted on the framework of the machine. Upon the opposite end of the shaft 18 from the pulleys 19 is a friction cone 21, which engages a friction pulley 22, mounted on shaft 23, which occupies a position inclined to the position of the shaft 18. Upon the shaft 23 is a worm 24, which engages a worm-wheel 25 fast on a shaft 26, carrying a fast pinion 27, which meshes with a relatively large gear 28 fast on the shaft 17. By virtue of this construction and arrangement, the speed of the shaft 18 is gradually diminished through the instrumentality of the reducing speed mechanism just described, whereby very slow movement is imparted to the shaft 17.

On opposite sides of the cams 16 are arranged arms 29, which are pivoted on the framework, as shown at 30. These arms are each composed of two members, between which is located an anti-friction roller 31, adapted to engage the face of the cam 16, as the shaft 17 rotates. The extremity of each arm 29, remote from its pivot 30, is formed into a ball-cup 32, in which rests the lower ball extremity 33 of a rod 34, whose upper extremity 35 is ball-shaped and fits into a cup 36 fast on the bottom of the lowermost deck 10 of the table.

It will be understood that the mechanism for regulating the inclination of the tables is duplicated on the opposite sides of the cam 16. Each of these cams 16 has three faces, which may be designated A, B and C. The face A is relatively long, and extends from a point 37 to a point 38, traveling in the direction of the arrow, adjacent the said cam, or the face which is the greater distance between the points 37 and 38, following the periphery of the cam; while the face B extends on the periphery of the cam from the point 37 to a point 39, the length of the said face being the shorter distance between the points 37 and 39 on the periphery of the cam; and, finally, the face C has a length equal to the shorter distance between the two points 38 and 39 on the periphery of the cam. The face A of the cam is farthest from the axis of the cam; the face B is somewhat nearer the axis of the cam; while the innermost point of the face C is nearest the axis of the cam. Hence, while the roller 31 of each arm 29 is in engagement with the faces A of the two cams 16, the table acted on by the arm 29 will be elevated to its highest position, and it is during this time that the metallic values are stratified on the table. In other words, this condition exists while the cams 16 are traveling from the point 37 to the point 38 in the direction of the arrow adjacent the cam 16 in Fig. 1 of the drawing. Now, as soon as the point 37 has left the roller 31, the latter engages the face B, which, being somewhat nearer the center of motion than the face A, allows the table to tilt and remain in the tilted position until the cam has traveled from the point 37 to the point 39 in the direction of the same arrow. During this time, the ore may be said to be passing through a dressing process upon the table, whereby a considerable portion of the gangue is removed, immediately preceding the discharge of the concentrates, which takes place while the cam is passing from the point 39 to the lowest point of the face C of the cam, during which time the table passes to its lowest inclination, after which it begins to rise, the elevation continuing until the cam has traveled from the lowest point of the face C to the point 38, or the beginning of the face A of the cam.

The two tables 7, which are arranged on opposite sides of the center of the machine, are arranged to alternately assume the lowest position of inclination, and, after the table on the left, for instance, (see Fig. 1), has reached its lowest point of inclination, the cam must make a half revolution, approximately, before the table 7 on the right assumes such inclination. However, by virtue of the fact that the face A of the cam is so long, both tables simultaneously occupy their highest position, or their position of least inclination, during a considerable portion of the time.

Suitably mounted on a platform 40 supported on the framework of the machine is a distributer 41, consisting of a hopper 42, which contains a series of partitions 43, forming the said hopper into a series of compartments, whose bottoms slope alternately in opposite directions, those on the left hand side lying in the same plane with an inclined plate 44, extending downwardly on the right hand side of the center of the mouth or hopper of the distributer, while the bottoms of those on the right hand side lie in the same plane with an inclined plate 44 extending downwardly from the center of the hopper on the left hand side. Provision is made for further distribution of the pulp by means of several series 46 of partitions 47, which form compartments, which are alternately closed at their lower ends, as shown at 48. The compartments which are closed at their lower ends are open at the bottom, as shown at 49, whereby the pulp passes to plates oppositely inclined, as shown at 50. One of these plates 50, viz.,—the one nearer the center of the machine, contains an additional series of partitions 51 forming compartments which are alternately closed at their lower ends, as shown at 52, and open at the bottom, as shown at 53. The pulp which passes through the bottom openings 53 strikes inclined plates 54 and passes thence to the bottom 55 of the distributer, while the pulp which enters the compartments formed by the partitions 51, and whose bottoms are closed, their rear extremities being open, passes to an extension 56 of the inclined plate 50 and falls therefrom to the bottom of the distributer. Furthermore, the pulp which passes below the series of compartments 46, by reason of the fact that the lower extremities of the compartments are open, passes to an extension 57 of the plate 44, and falls therefrom to the bottom of the distributer.

The opposite sides of the distributer, close to the bottom thereof, contains outlet openings 58 through which the material passes in opposite directions to the extension wings 59 of the distributer-supporting platform 40, and passes thence in opposite directions to the feed launders 60, which are pivotally mounted, as shown at 61, and have a length equal to the width of the tables and of the distributer, as heretofore explained, in order to maintain the distribution which has been effected in the distributer proper. These feed launders are tiltable through the instrumentality of two cams 62, mounted on the shaft 17, near the opposite ends of the machine, the said cams having their peripheries shaped to conform somewhat to the shape of the cam 16 for tilting the tables with which the feed launders coöperate, as hereinafter more fully described in detail.

Each cam 62 may be said to have three faces D, E and F. The face D has a length on the periphery of the cam equal to the longer distance between the points 63 and 64. The face E has a length on the periphery of the cam equal to the shorter distance between the points 63 and 65; while the face E has a length equal to the shorter distance between the points 64 and 65 on the face of the cam. Hence, each feed launder is maintained in a certain position, termed its normal position, viz., that shown at the right of Figs. 1 and 4, during the greater portion of the time, that is to say, approximately during the time that its corresponding table is in its highest position,— the horizontal position, or the position of least inclination. This normal position of the feed launder is maintained while each cam 62 is traveling in the direction of the arrow adjacent the cam from the point 63 to the point 64 on the periphery of the cam. The feed launder is then gradually tilted to the position shown at the left of Figs. 1 and 4, while the cam is traveling in the same direction from the point 63 to the point 65, when the feed launder has its greatest rearward tilt, its discharge extremity occupying the highest position. During the time that the cam is traveling from the point 65 to the point 64 in the direction of the arrow, the engaging roller 66 encounters a projection 67, which is formed on the face F of the cam, whereby the feed launder is tilted slightly forwardly for the purpose of discharging an additional quantity of water upon the table, when the latter is at its position of greatest inclination to further facilitate the removal of the concentrates from the table by the discharge of comparatively pure water thereon.

Interposed between the cam 62 of each feed launder 60 is an angular lever 68 and a rod 69. This lever is fulcrumed intermediate its extremities, as shown at 70, one end being equipped with an anti-friction roller 66, while its opposite end carries concave sockets 71 adapted to receive the ball extremity 72 of the rod 69, whose opposite extremity is also ball-shaped, as shown at 73, and engages a socket 74 of counterpart shape, applied to the rear extremity of the feed launder.

Each feed launder is provided with a partition 75, which, when the launder is in its normal position, is rearwardly inclined, and is so arranged that the material entering the launder from the extension wing 59 of the distributing plate shall fall thereon, the said partition causing the pulp to move rearwardly and pass to the bottom of the launder through an opening 76. By virtue of this arrangement, all of the pulp must pass to the rear of the launder before it can reach the bottom thereof.

Assuming now that the machine is in operation and that the material is being forwarded from the distributer to the feed launders, it may be assumed that the two tables are in the position illustrated in Fig. 1, the table on the right being at its highest position, either the horizontal position or slightly inclined, while the table on the left is at its lowest position of inclination. The position of the table on the right may be termed its normal position, while the corresponding feed launder is in a corresponding position, and the pulp is being constantly discharged from the feed launder to the table, passing thereto from the subdivider 12 and thence to the various decks. This position of the table is maintained while the cam 16 is passing in the direction of the arrow adjacent the cam from a point 38 on the periphery of the cam to the point 37; and the corresponding position of the feed launder is maintained while the cam 62 is traveling in the direction indicated by the arrow from the point 64 on the periphery of the cam to the point 63. As soon as the point 37 of the cam passes the anti-friction roller 31, the table will begin the descent by virtue of the fact that the roller 31 has moved into engagement with the face B of the cam, whereby an increased inclination is brought about. During this same time, the cam 62 is traveling from the point 63 to the point 65, and the roller 66 engages this part of the cam, whereby the corresponding feed launder 60 is tilted rearwardly to the position shown at the left of Figs. 1 and 4. The table at the right is then still further tilted, while the cam is turning, whereby the roller 31 passes from the point 39 to the lowest point of the face C, and, during this time, water from the corresponding feed launder is being discharged on the table through the instrumentality of the subdivider, the solid pulp being retained in the rear part of the feed launder by virtue of the rearward inclination of the latter. Shortly after the table has reached its greatest downward inclination and the corresponding feed launder has reached its greatest rearward inclination, the projection 67 on the face of the cam 62 acts to impart a slight forward movement to the feed launder, whereby an increased quantity of water is discharged upon the table for completing the removal of the concentrates from the table when at its lowest point of inclination. After this occurs, the feed launder returns to its position of greatest rearward inclination, and the pulp which continues to enter the same from the distributer accumulates therein and fills the launder, while the table is returning to its normal or uppermost position, and this occurs while the roller 31 is traveling from the lowest point of the face C to the point 38, the said part of the periphery of the cam being, during such time, in engagement with the anti-frictional roller 31 of one of the pivoted arms 29, and as soon as this occurs, the anti-frictional roller 66 of one of the levers 68 has reached the point 64 on the face of the cam 62, whereby the corresponding feed launder is tilted forwardly rather suddenly, whereby a complete charge of pulp is quickly delivered to the table, this occurring immediately after the table has reached its upward limit of movement. This initial discharge of pulp from the feed launder upon the table, when the latter has reached its upward limit of movement, results in virtually emptying the feed launder upon the table, after which there is a normal and steady discharge of pulp to the table during the entire time that the latter remains at its upward limit of movement, the gangue being gradually discharged from the table into a trough 77, having a spout 78 at its lower extremity, which discharges into a nozzle 79, pivoted at 80. This nozzle, when the table is at its upward limit of movement and gangue only is being discharged therefrom, is in position to discharge the gangue into a compartment 81 of a receptacle 82, the latter being centrally divided by a partition 83. As soon as the table begins its descent, which occurs while the cam is traveling from the point 39 to the lowest point of the face C, the position of the nozzle 79 is shifted from that shown at the right of Fig. 1 to that shown at the left of Fig. 1, and, while the table is in this position, the concentrates are discharged into the compartment 84, which may be termed the concentrates compartment of the receptacle. The nozzles 79 are actuated to assume the aforesaid positions at the proper time through the instrumentality of a rotary member 85, having a cam groove 86, said member being fast on the shaft 17. Adjacent this cam and arranged on opposite sides of the shaft 17 are two levers 87, each of which is fulcrumed at 88, and carries a roller 89 mounted thereon, intermediate its extremities and engaging the groove 86. The lower extremity of each lever is pivotally connected, as shown at 90, with the inner extremity of a relatively long rod 91, whose outer extremity is pivotally connected, as shown at 92, with a nozzle 79. The groove 86 of the cam 85 is equally distant from the axis of the shaft 17, during the greater part of its length, or while the cam is traveling the distance from a point 93 on the inner wall of the groove to a point 94 on the wall of the groove, the travel being in the direction of the arrow,—see Fig. 3. During this time, the roller 89 of the lever 87 is carried outwardly, or farther away from the axis of the shaft 17, by virtue of the change in the shape of the cam, and, during this time, the rod 91 is moved outwardly away from the axis of rotation of the cam sufficiently to throw the nozzle 79 into position to discharge into the concentrates compartment 84 of the receptacle 82. From this explanation, it will be understood that the two nozzles 79 are alternately shifted to discharge into the tailings compartment 81 and the concentrates compartment 84, the shaft 71 making a half revolution in the mean time, since the rollers 89 of the two levers 87 are arranged at diametrically opposite points of the axis of the shaft 17. From this, it will be understood that the movement of the nozzles 79 will harmonize with the movements of the two tables 7, as heretofore explained.

In order to prevent the material from traveling any distance from the discharge extremities of the decks 10 of each table 7, the side walls 95 of each table are equipped at their free ends with transversely arranged deflecting boards 96, which have beveled inner faces 97, whereby the material, as it strikes each face, is deflected inwardly and is prevented from passing through peep openings 98 which separate the deflectors 96, the said openings being arranged between the uppermost deck and the deck next below and between the last-named deck and the bottom deck, thus making it practicable to observe the condition of the material on the two decks which would otherwise be concealed from view.

By virtue of the construction and arrangement of the deflecting members 96, the material discharged from each table is caused to drop approximately vertically downward, whereby it is directed into the trough 77. This construction also saves space in arranging the concentrating apparatus.

Attention is called to the fact that, from the time that the concentrating table begins its descent from its normal position until it reaches its lowest limit of movement or greatest downward inclination, the corresponding feed water box or launder is gradually tilted rearwardly, the rearward tilting movement, however, not being sufficient to entirely cut off the discharge from the said box or launder, but this discharge is practically free from solid material, since the rearward tilt of the launder has a tendency to cause the solid material to settle therein, particularly in view of a partition 75 located in the said launder and extending forwardly and projecting slightly upwardly from the rear wall of the launder, the pulp, as it is discharged into the launder, falling upon the partition and being carried rearwardly to the rear wall of the launder, after which it passes downwardly through an opening 76 in the partition adjacent the rear wall.

Because of the rearward tilting action of the launder, during the period aforesaid, only a portion of the water which enters the launder during such period escapes therefrom to the table, this water being utilized for dressing the ore or further removing the gangue from the metallic values stratified on the table, the said dressing taking place after the pulp discharge proper from the launder to the table has ceased. This rearward tilting movement of the launder is important, since it not only practically cuts off the discharge of pulp, preparatory to the commencement of the final cleaning or dressing step, but it also preserves a part of the water which enters the launder with the pulp from the distributer. The total amount of the water which enters the launder with the pulp is too great for the performance of the ore cleaning or dressing function, and, if the entire quantity of water entering the launder, were discharged upon the table during this operation, there would be a tendency to wash a portion of the metallic values from the table. However, by virtue of the gradual tilting of the feed box or launder, it becomes practicable to accurately measure and deliver to the table the proper amount of water for ore dressing purposes, allowing the balance, together with the solid particles, to accumulate in the feed box or launder.

As soon as the table has reached its lowest limit of movement, and, during the discharge of the concentrates from the table, when in this position, it is desirable to somewhat increase the discharge of water from the launder to the table to facilitate the removal of the concentrates, and, for this purpose, the face F of the cam 62 is provided with a projection 67, which, through the medium of the connections heretofore described, acts on the corresponding feed launder to tilt the latter forward momentarily for the aforesaid purpose, after which it resumes its rearwardly tilted position and the pulp and water accumulate in the launder, during the upward movement of the table to its normal position, and, as soon as this occurs, the corresponding feed launder is tilted downwardly rather quickly, whereby its accumulated contents are quickly discharged upon the table, thus covering the deck of the latter, after which the normal discharge of the pulp to the table continues until the latter begins its downward movement, as aforesaid.

The two tables are connected in operative relation by means of a rod 99, which passes through two bars 100, whose extremities engage the opposite ends of the two tables, the said table ends being equipped with frusto-conical journals 101, having hollow members 102 of counterpart shape applied thereto and secured in position by means of a washer 103 and a nut 104 screwed upon the reduced threaded extremity of the journal 101. The two bars 100 are clamped on the rod 99 between a shoulder 105 and a nut 106, which is screwed on the threaded extremity 107 of the connecting rod. One extremity of this rod is threaded into the shoulder 105, which is expanded into a member 108, which is connected with a companion member 109 to form a socket 110 for the ball extremity 112 of a stem 113, to which is imparted a reciprocating movement by the shaft 18 carrying an eccentric 115 engaging a strap 116.

The bearings 8 for each table consist of depending projections secured to the table and engaging cup-shaped members 118, which allow the projections to swing therein. These members 118 are also arranged to reciprocate in supporting heads 119 formed on the main support 9 during the longitudinal reciprocation of the tables, the said movement being imparted by the eccentric construction heretofore explained.

Having thus described my invention, what I claim is:—

1. The combination with a concentrating table tiltable to progressively occupy positions for feeding and cleaning purposes, and means for so tilting the table, of a combined feed and reserve box tiltable to deliver all the pulp to the table during the feeding period and reserve the heavier pulp or solids in the bottom of the box and deliver to the table the lighter material and water from the top of the box during the cleaning period, and means for so tilting the said box.

2. The combination of a concentrating table normally occupying a position for feeding purposes and tiltable to occupy a position for cleaning purposes, means for so tilting the table, a combined feed and reserve box, and means for automatically manipulating the box to deliver all the pulp to the table during the feeding period, and reserve the heavier pulp, or solids, in the bottom of the box and deliver to the table the lighter material and water during the cleaning period.

3. The combination with a concentrating table, of a combined feed and reserve box, and means for automatically manipulating the said box to deliver all the pulp to the table during the feeding period and reserving the heavier pulp or solids in the bottom of the box and delivering to the table the lighter material and water from the top of the box during the cleaning period, and means for automatically discharging an additional amount of water from the top of the box at the close of the cleaning period.

4. The combination with a concentrating table progressively tiltable to occupy three different positions, first for receiving the material, separating the values and discharging the gangue, second, removing the balance of the gangue, and third, removing the concentrates from the table, and a feed and reserve box tiltable to occupy three positions to correspond with the three aforesaid positions of the table, means for so tilting the box simultaneously with the tilting movements of the table.

5. The combination of a tiltable concentrating table, means connected with the table to tilt the latter to three positions of successively greater inclination and maintain the inclinations for predetermined periods, means for supplying pulp during the period of least inclination, for cut off of pulp during the periods of increased inclination, and for supplying water during the two periods of greater inclination, said last-named means comprising a single box normally occupying the pulp supplying position but rearwardly tiltable to reserve the heavier pulp and solids while discharging water upon the table, as aforesaid and means for so tilting the box.

6. The combination of a tiltable concentrating table, a cam having three faces, means connected to the table and bearing upon said cam, the faces of the cam being proportioned to tilt the table to three positions of successively greater inclination and maintain the inclinations for predetermined periods, and means for supplying pulp during the period of least inclination, for cutting off the supply of pulp during the periods of increased inclination, and for supplying water during the two periods of greater inclination, said last-named means consisting of a single receptacle normally occupying the pulp supplying position, but rearwardly tiltable for cutting off the heavier pulp or solids, while permitting the discharge of water upon the table, as aforesaid, and means for so tilting the receptacle, substantially as described.

7. The combination of a tiltable concentrating table, a cam having three faces, means connected to the table and bearing upon said cam, the faces of the cam being proportioned to tilt the lever to three positions of successively greater inclination and maintain the inclinations for predetermined periods, means for supplying pulp during the period of least inclination, for cutting off the supply during the periods of increased inclination, and for supplying water during the two periods of greater inclination, said last-named means including a box normally occupying the pulp supplying position, but rearwardly tiltable to reserve the heavier pulp or solids, while permitting the discharge of water upon the table, as aforesaid, and means for so tilting the box, the relative length of the three cam faces being such that the time during which the table is maintained in the first position is relatively long and in the second and third positions relatively short and approximately equal, substantially as described.

8. The combination of a tiltable concentrating table, means connected with the table to tilt the latter to three positions of successively greater inclination and maintain the inclinations for predetermined periods, and means for supplying pulp during the period of least inclination for cutting off the pulp during the periods of increased inclination, and for supplying water during the two periods of greater inclination, the said last-named means comprising a single receptacle normally occupying the pulp supplying position, but rearwardly tiltable, whereby a relatively deep pool is formed in the box, allowing the pulp to settle and reserving the same during the periods of increased inclination, but allowing a water discharge, as aforesaid, and means acting in harmony with the table-inclination-changing means for regulating the position of the said box, substantially as described.

9. The combination with a tiltable concentrating table, adapted to assume a plurality of positions of inclination during one of which the gangue is discharged from the table, while during the other of which the concentrates are discharged therefrom, of a receptacle containing two compartments, one for receiving the concentrates and the other for receiving the gangue, means interposed between the table and the said compartments for directing the material into the latter, said means including a pivoted nozzle, and means for automatically shifting the said nozzle to discharge into one compartment or the other, and means for operating the nozzle in harmony with the movements of the table.

10. The combination of a plural deck concentrating table, tiltably mounted, the decks being arranged one above another and rigidly connected, deflectors located forward of the respective decks of the table for preventing the discharge of the material from the decks beyond a limited distance, openings being left between the deflectors to permit inspection of the decks below the uppermost, substantially as described.

11. The combination of a tiltable concentrating table, means for causing the table to assume a position inclined to a greater degree than its normal position, a feed box also tiltably mounted, means for constantly supplying the said box with pulp to be treated, and means for gradually tilting the said box rearwardly, whereby the discharge therefrom to the table is less than the supply to the box during the period of the aforesaid increased inclination of the table.

12. The combination with a tiltable concentrating table normally occupying a predetermined position to receive the pulp to be treated, means for tilting the table to increase its downward inclination from the head toward its discharge edge, a feed box for supplying the table with pulp while occupying the normal position, means for constantly supplying the feed box with pulp, and means for gradually tilting the feed box rearwardly to reduce the supply to the table while the latter is passing from its normal position to its position of greatest inclination.

13. The combination of two concentrating tables arranged side by side, bars respectively engaging the opposite ends of the two tables, in which bars the tables are trunnioned, the tables having supports below the journals, a rod centrally connecting the two bars, means applied to the rod for clamping the tables between the bars, and means connected with the rod for imparting a longitudinal reciprocating movement to the tables, substantially as described.

14. The combination of two concentrating tables arranged side by side, two bars applied to the opposite extremities of the tables and having openings to receive conical journals with which the tables are equipped, hollow cones applied to the said journals, and means for clamping the bars to the tables, the hollow cones being acted on by the bars to regulate the friction on the table trunnions, substantially as described.

15. The combination with a concentrating table adjustable to occupy different positions during the feeding and cleaning periods, and means for so adjusting the table, of a combined feed and reserve box movably mounted, and means for manipulating the said box to deliver all the pulp to the table during the feeding period, and reserve the heavier pulp or solids in the bottom of the box and deliver to the table the lighter material and water from the top of the box during the cleaning period.

In testimony whereof I affix my signature in presence of two witnesses.

ARTHUR R. WILFLEY.

Witnesses:
  A. J. O'BRIEN,
  ALBERT O'BRIEN.